United States Patent
Hishida et al.

(10) Patent No.: US 7,747,386 B2
(45) Date of Patent: Jun. 29, 2010

(54) COLLISION DETECTION SENSOR

(75) Inventors: Yasuyuki Hishida, Hitachi (JP); Hisashi Sato, Hitachi (JP); Akira Suzuki, Aichi (JP); Shigenori Kobayashi, Aichi (JP); Hiroyuki Takahashi, Aichi (JP)

(73) Assignees: Hitachi Cable, Ltd., Tokyo (JP); Denso Corporation, Aichi (JP)

(*) Notice: Subject to any disclaimer, the term of this patent is extended or adjusted under 35 U.S.C. 154(b) by 974 days.

(21) Appl. No.: 11/511,491

(22) Filed: Aug. 29, 2006

(65) Prior Publication Data

US 2007/0053647 A1 Mar. 8, 2007

(30) Foreign Application Priority Data

Aug. 30, 2005 (JP) ............... 2005-248836

(51) Int. Cl.
G08G 1/16 (2006.01)
(52) U.S. Cl. ............ 701/301; 250/227.14; 250/227.16; 427/163.1; 427/163.2; 385/12
(58) Field of Classification Search ........... 701/301; 385/12, 137; 250/227.14, 227.16; 427/163.1, 427/163.2
See application file for complete search history.

(56) References Cited

U.S. PATENT DOCUMENTS

| | | | | |
|---|---|---|---|---|
| 4,226,504 A | * | 10/1980 | Bellino | 385/104 |
| 4,342,907 A | * | 8/1982 | Macedo et al. | 250/227.14 |
| 4,381,140 A | * | 4/1983 | van der Hoek et al. | 385/104 |
| 4,572,950 A | | 2/1986 | Harmer | |
| 4,618,764 A | * | 10/1986 | Harmer | 250/227.14 |
| 4,795,232 A | * | 1/1989 | Persson | 385/13 |
| 4,846,547 A | * | 7/1989 | Falco et al. | 385/13 |
| 5,084,615 A | * | 1/1992 | Tracey | 250/227.16 |
| 5,193,129 A | * | 3/1993 | Kramer | 385/13 |
| 5,392,024 A | * | 2/1995 | Kiuchi et al. | 340/436 |
| 5,502,301 A | * | 3/1996 | Lord | 250/227.14 |
| 5,604,318 A | * | 2/1997 | Fasshauer | 73/862.624 |
| 5,633,494 A | * | 5/1997 | Danisch | 250/227.16 |
| 5,913,245 A | * | 6/1999 | Grossman | 73/800 |
| 6,114,949 A | * | 9/2000 | Schmitz et al. | 340/425.5 |

(Continued)

FOREIGN PATENT DOCUMENTS

DE 3443949 A1 6/1986

(Continued)

OTHER PUBLICATIONS

A.J.Barlow et al.,Birefringence and Polarization mode-dispersion in spun single-mode fibers, Sep. 1981, Applies Optics, vol. 20, No. 17, pp. 2962-2968.*

(Continued)

*Primary Examiner*—Khoi Tran
*Assistant Examiner*—Jaime Figueroa
(74) *Attorney, Agent, or Firm*—McGinn IP Law Group, PLLC

(57) ABSTRACT

A collision detection sensor for detecting a collision of a vehicle and a collision object by converting the collision into a change in optical transmission characteristics of an optical fiber. The collision detection sensor has the optical fiber, a molding material formed on the periphery of the optical fiber, and a convex portion formed on the surface of the molding material.

7 Claims, 4 Drawing Sheets

U.S. PATENT DOCUMENTS

| | | | |
|---|---|---|---|
| 6,607,212 B1 * | 8/2003 | Reimer et al. | 280/735 |
| 2002/0162952 A1 * | 11/2002 | Stuetzler | 250/227.14 |
| 2003/0108323 A1 * | 6/2003 | Hashimoto | 385/137 |
| 2003/0142920 A1 * | 7/2003 | Dallas et al. | 385/80 |
| 2003/0164755 A1 * | 9/2003 | Moritz et al. | 340/436 |
| 2003/0209655 A1 * | 11/2003 | Wang | 250/227.14 |
| 2004/0256543 A1 * | 12/2004 | Ishihara | 250/227.14 |
| 2005/0005706 A1 * | 1/2005 | Reichinger et al. | 73/800 |
| 2006/0008197 A1 * | 1/2006 | Hohne et al. | 385/13 |

FOREIGN PATENT DOCUMENTS

| | | |
|---|---|---|
| DE | 103 33 732 B3 | 12/2004 |
| EP | 0 038 401 A1 | 1/1981 |
| JP | 63-91122 | 6/1988 |
| JP | 3-202776 | 9/1991 |
| JP | 6-76914 | 10/1994 |
| JP | 6-46176 | 11/1994 |
| JP | 7-3370 | 1/1995 |
| JP | 7-190732 | 7/1995 |
| JP | 2002-23030 | 1/2002 |
| JP | 2002-531812 | 9/2002 |
| JP | 2004-223766 | 8/2004 |
| WO | WO 03/069294 A1 | 8/2003 |
| WO | WO 2004040250 A1 * | 5/2004 |
| WO | WO 2004/089699 A1 | 10/2004 |
| WO | WO 2004089699 A1 * | 10/2004 |

OTHER PUBLICATIONS

European Search Report dated Jan. 31, 2007.

* cited by examiner

COLLISION DETECTION SENSOR

The present application is based on Japanese patent application No. 2005-248836 filed on Aug. 30, 2005, the entire contents of which are incorporated herein by reference.

BACKGROUND OF THE INVENTION

1. Field of the Invention

This invention relates to a collision detection sensor to detect the collision of a vehicle and a collision object by converting the collision stress into a change in optical transmission characteristics of an optical fiber.

2. Description of the Related Art

It is considered to improve the safety of pedestrians by placing the collision detection sensor to detect the collision with the collision object (e.g., a pedestrian) on the periphery (e.g., a bumper) of a vehicle.

A collision detection optical fiber sensor is known which detects a collision by converting the collision stress into a change in the optical transmission characteristics of an optical fiber. For instance, the collision detection optical fiber sensor is constructed such that a plurality of holes are provided in a longitudinal direction on a metallic stress concentration board, the optical fiber is arranged along the stress concentration board, and the stress concentration board and the optical fiber are covered with a molding material. According to this, when collision force presses the optical fiber against the stress concentration board, the optical fiber is bent at both edges of the hole. Thereby, an increase in transmission loss due to the bending can occur in accordance with the collision force.

The related art to the invention is, e.g., JP-A-2002-531812.

In the above collision detection optical fiber sensor, it is necessary to use the metallic stress concentration board made of iron etc.

SUMMARY OF THE INVENTION

It is an object of the invention to provide a collision detection sensor that is capable of detecting the collision from an increase in transmission loss of the optical fiber caused by the collision without using the stress concentration board.

According to the invention, collision detection sensor for detecting a collision of a vehicle and a collision object by converting the collision into a change in optical transmission characteristics of an optical fiber, comprising:

the optical fiber;

a molding material formed on the periphery of the optical fiber; and a convex portion formed on the surface of the molding material.

In the above invention, the following modifications and changes can be made.

(i) The molding material comprises a flat surface facing one direction, and a plurality of the convex portions are formed on the flat surface at intervals in a longitudinal direction of the optical fiber.

(ii) The molding material comprises a first flat surface facing one direction and a second flat surface facing the opposite direction to the one direction, and a plurality of the convex portions are formed on the first and second flat surfaces at intervals in a longitudinal direction of the optical fiber.

(iii) The convex portion formed on the first flat surface is disposed at a different position from the convex portion formed on the second flat surface in the longitudinal direction of the optical fiber.

(iv) The convex portion formed on the first flat surface is disposed at a same position as the convex portion formed on the second flat surface in the longitudinal direction of the optical fiber.

(v) The convex portion is molded integrally with the molding material by using a mold with a concave portion.

(vi) The molding material comprises a flat surface, and the convex portion is attached onto the flat surface of the molding material.

(vii) The molding material is formed in a long cylindrical shape, and the convex portion is formed in spirals on the periphery of the molding material.

(viii) The molding material in the long cylindrical shape and the convex portion in spirals are extruded and molded integrally.

(ix) The convex portion in spirals is attached on the periphery of the molding material after the molding material in the long cylindrical shape is molded by extrusion.

ADVANTAGE OF THE INVENTION

According to this invention, the following excellent effects can be obtained.

(1) Since the collision detection sensor contains no metallic members, its handling property can be improved.
(2) Since the collision detection sensor contains no metallic members, its weight can be reduced.
(3) Since the collision detection sensor has no stress concentration board, the cost can be reduced.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Construction of Collision Detection Sensor

Figure 1:
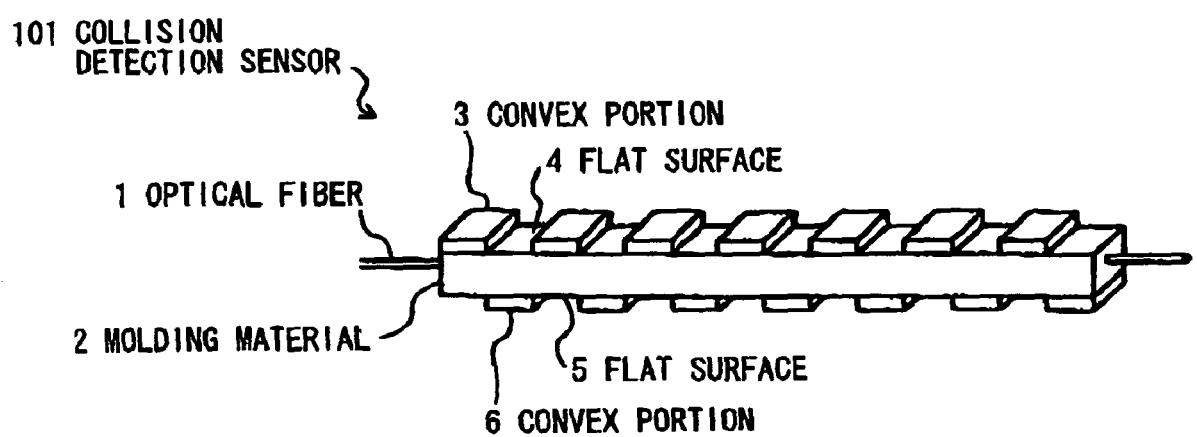
FIG. 1 is a perspective view showing a collision detection sensor in a first preferred embodiment according to the invention.

Collision detection sensors 101 to 104 in the preferred embodiments according to this invention are capable of detecting the collision with a pedestrian by converting the collision with a vehicle into a change in optical transmission characteristics of an optical fiber 1. As shown in FIGS. 1 to 4, the collision detection sensors 101 to 104 each comprises the optical fiber 1, a molding material 2 or 32 that covers the periphery of the optical fiber 1, the molding material being deformable by the collision, and a convex portion 3, 6 or 33 that is formed on the surface of the molding material 2 or 32.

Plastic optical fibers (POF) such as HPOF can be used as the optical fiber 1.

A resin rubber material is preferably available as the molding materials 2 and 32, and a silicone rubber is preferably available as them in consideration of the temperature characteristic. As for hardness, 70 to 40 degrees in hardness are preferable though the hardness depends on the demand sensitivity.

In the collision detection sensors 101 to 104, when the molding material 2 or 32 is locally deformed, the optical fiber 1 can be also locally deformed. Further, when the molding material 2 or 32 is locally compressed, the optical fiber 1 can be also compressed locally.

Construction of Collision Detection Sensor 101

The collision detection sensor 101 of the preferred embodiment as shown in FIG. 1 is provided with a flat surface 4 formed on the molding material 2, the flat surface 4 facing at least one direction where the collision detection is expected, and convex portions 3 are formed on the flat surface 4 at intervals in the longitudinal direction of the optical fiber 1.

By the structure of the molding material 2 with the flat surface 4, a load due to the collision can be easy applied to the flat surface 4 when a collision object collides with the molding material 2. Especially, due to the convex portion 3 formed on the flat surface 4, the load can be easy applied to the convex portion 3 and therefore, the amount of compression (or amount of deformation) in the molding material 2 can be increased since an area subjected to the load in the early phase of the load application can be reduced thereby. Thus, as the amount of compression (amount of deformation) in the molding material 2 increases, the amount of compression (amount of deformation) in the optical fiber 1 also increases. Along with this, the amount of change in the optical transmission characteristics increases. Therefore, the sensitivity of the collision detection sensor can be improved.

The compression or the deformation of the molding material 2 can be generated at multiple parts by disposing a plurality of the convex portions 3 at intervals in the longitudinal direction of the optical fiber 1, provided that the size of the collision object is sufficiently greater than the disposition pitch of the convex part 3.

Further, in the collision detection sensor 101, as well as having the flat surface 4 facing the direction where the collision detection is expected, a flat surface 5 facing the opposite direction is formed on the molding material 2. In addition, a convex portion 6 similar to the convex portion 3 is disposed on the flat surface 5 at intervals in the longitudinal direction of the optical fiber 1.

Further, in the collision detection sensor 101, the convex portion 3 on the flat surface 4 facing the one direction and the convex portion 6 on the flat surface 5 facing the opposite direction are alternately disposed at different positions in the longitudinal direction of the optical fiber 1. In other words, the flat surface 5 is kept flat in a section in the longitudinal direction of the optical fiber 1 where the convex portion 3 is formed on the flat surface 4, and, conversely, the convex portion 6 is formed on the flat surface 5 in a section where the flat surface 4 is flat (i.e., not convexed). The length (hereinafter referred to as width) of the section where the convex portion 3 is formed on the flat surface 4 is equal to the width of the section where the flat surface 4 is flat.

Thus, since the convex portion 3 and the convex portion 6 are disposed at different positions from each other in the longitudinal direction of the optical fiber 1, the bending of the optical fiber 1 can be efficiently generated. This is because, in this collision detection sensor, as well as allowing the load caused by the collision to be easy applied to the convex portion 3 when the collision object collides with the molding material 2, the molding material 2 can be easy deformed in the reverse directions on the section of the convex portion 3 and that the section of the convex portion 6 since the opposite side of the convex portion 3 is flat between the neighboring convex portions 6.

In this case, since it is assumed that the convex portion 6 contacts a structure such as a vehicle body, reactive force against the load will be applied to the convex portion 6 from the structure when the load caused by the collision is applied to the convex portion 3.

Construction of Collision Detection Sensor 102

Figure 2:
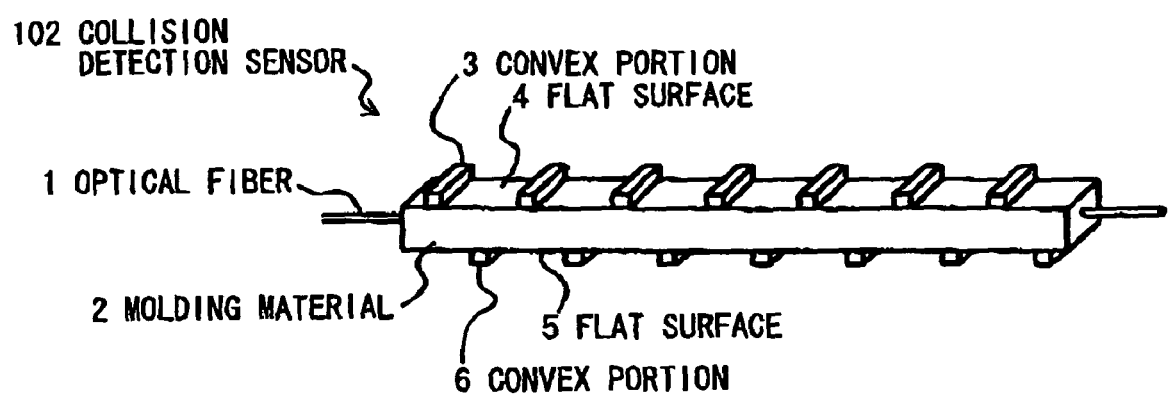
FIG. 2 is a perspective view showing a collision detection sensor in a second preferred embodiment according to the invention.

Also in the collision detection sensor 102 of the second preferred embodiment as shown in FIG. 2, the convex portion 3 and the convex portion 6 are disposed at different positions in the longitudinal direction of the optical fiber 1 as well as the preferred embodiment of FIG. 1.

However, widths defined by the convex portion 3 and the convex portion 6 in the longitudinal direction of the optical fiber 1 in the second embodiment as shown in FIG. 2 are narrower than those in the first preferred embodiment as shown in FIG. 1.

As exemplified in the collision detection sensor 102, the sensitivity thereof can be further improved by reducing the area to receive the load in early phase of the load application so as to increase the amount of deformation in the molding material 2.

Modifications

On the other hand, when the width of the convex portion 3 and the convex portion 6 is increased, the area to receive the load is increased and, thereby, the amount of compression (or the amount of deformation) in the molding material 2 can be reduced and the amount of compression (or the amount of deformation) in the optical fiber 1 can be reduced. As a result, the load capacity can be increased since the load (i.e., sensor breaking load) corresponding to the compression (or deformation) that the optical fiber 1 may be destroyed is increased.

The amount of compression in the molding material 2 can be also increased by increasing the height of the convex portions 3 and 6.

Alternatively, though it is not shown, contrary to the embodiments as shown in FIG. 1 and FIG. 2, another embodiment can be constructed such that the convex portion 3 on the flat surface 4 facing the one direction and the convex portion 6 on the flat surface 5 facing the opposite direction are disposed at intervals and at the same positions in the longitudinal direction of the optical fiber 1. In this embodiment, the optical fiber 1 will be compressed from both sides by the load applied to the convex portion 3 and the reactive force applied to the convex portion 6. Thus, it is possible to generate the change in the optical transmission characteristics due to the compression strain of the optical fiber 1.

Method of Making the Collision Detection Sensors 101 and 102

Methods of making the collision detection sensors 101 and 102 as shown in FIGS. 1 and 2 will be explained below.

The first method is conducted such that the optical fiber 1 with the molding material 2 formed on the periphery thereof is formed by extrusion, and then the outer shape of the molding material 2 is adjusted by pressing, where the convex portion 3 and 6 are molded integrally with the molding material 2 by forming a concave portion in the mold to press the outer shape of the molding material 2. In this method, since the convex portions 3 and 6 are molded simultaneously with the molding material 2, the number of steps can be reduced.

The second method is conducted such that the optical fiber 1 with the molding material 2 formed on the periphery thereof is formed by extrusion, and then the outer shape of the molding material 2 is adjusted by pressing, where the molding material 2 with the flat surfaces 4, 5 is formed, and then the convex portions 3 and 6 are attached on the flat surfaces 4, 5 through an adhesive. In this method, the structure of the mold can be simplified.

The third method is conducted such that by using a SUS (stainless steel) stick instead of the optical fiber 1, the SUS stick with the molding material 2 formed on the periphery thereof is formed by extrusion, and then the molding material 2 is cured by vulcanization, and then the SUS stick is removed from the molding material 2 to make a hole in the molding material, and then the optical fiber 1 is inserted into the hole.

Construction of Collision Detection Sensors 103, 104

Figure 3:
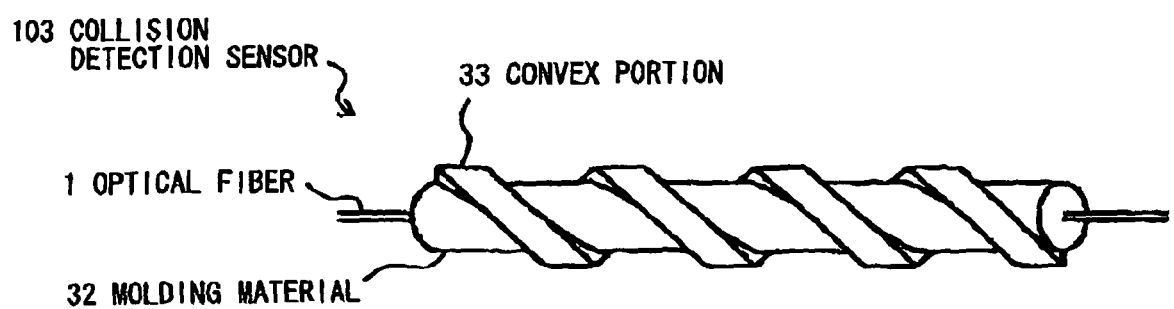
FIG. 3 is a perspective view showing a collision detection sensor in a third preferred embodiment according to the invention.

A collision detection sensor 103 of the third preferred embodiment is constructed such that, as shown in FIG. 3, a molding material 32 is formed into a long cylindrical shape, the optical fiber 1 is disposed like the axis of the cylindrical shaped molding material 32, and a convex portion 32 is formed around the molding material 32 in spirals.

Figure 4:
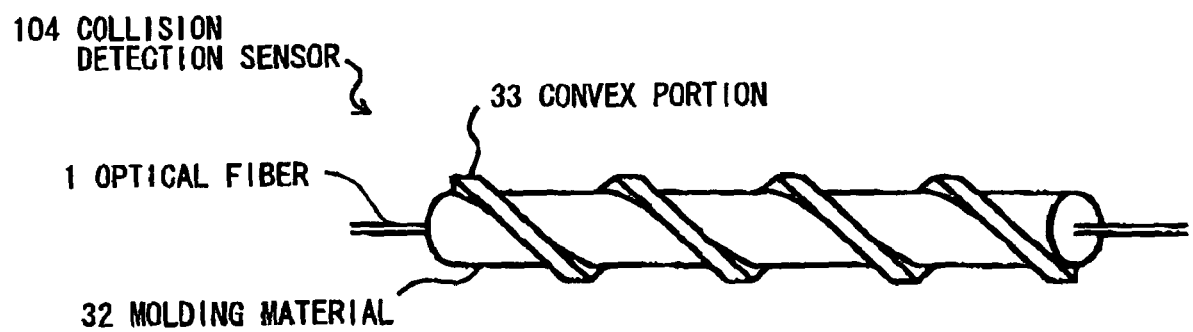
FIG. 4 is a perspective view showing a collision detection sensor in a fourth preferred embodiment according to the invention.

Also, a collision detection sensor 104 of the fourth preferred embodiment is constructed such that, as shown in FIG. 4, the molding material 32 is formed into a long cylindrical shape, the optical fiber 1 is disposed like the axis of the cylindrical shaped molding material 32, and the convex portion 32 is formed around the molding material 32 in spirals. However, in the collision detection sensor 104, the width of the convex portion 33 defined in the longitudinal direction of the optical fiber 1 is narrower than that in the collision detection sensor 103.

In the collision detection sensors 103, 104 as shown in FIGS. 3 and 4, unlike the collision detection sensors 101, 102 as shown in FIGS. 1 and 2, the direction to detect the collision is not limited to a specific direction since the convex portion 33 is formed on the molding material 32 in spirals.

Further, since the collision detection sensors 103, 104 can be bent easily in a horseshoe shape, it can be attached to the vehicle body while being bent in the horseshoe shape. Even when using the portion bent in the horseshoe shape, the collision can be detected since the optical fiber 1 disposed like the axis of the molding material 32 is compressed (or deformed) when the molding material 32 with the convex portion 33 is compressed (or deformed).

It is preferred that the curvature of the optical fiber 1 at the portion bent in the horseshoe shape is so small that no influence on the optical transmission characteristics appears, and that the curvature of the optical fiber 1 when transforming by collision is so big that the influence on optical transmission characteristics becomes remarkable.

In the collision detection sensor 103, the width of the convex portion 33 is almost the same as the non-convex portion (i.e., the valley between the neighboring convex portions 33) are almost same. On the other hand, in the collision detection sensor 104, the width of the convex portion 33 is narrower than that of the non-convex portion. Thus, the collision detection sensor 104 can have an improved sensitivity improved since the area to receive the load in early phase of the load application is reduced. On the other hand, in the collision detection sensor 103, the sensor breaking load can be increased since the area to receive the load is increased, and the load capacity can be increased.

Method of Making the Collision Detection Sensors 103 and 104

Methods of making the collision detection sensors 103 and 104 as shown in FIGS. 3 and 4 will be explained below.

The first method is conducted such that the optical fiber 1 with the molding material 32 formed on the periphery thereof is formed by extrusion, where an extruder opening is used which has a shape that a rectangle notch corresponding to the convex portion 33 is provided on the circumference of a circle, and the molding material 32 in long cylindrical shape and the convex portion 33 in spirals are extruded and molded integrally by rotating the extruder opening. In this method, since the convex portions 33 and the molding material 32 are molded at the same time, the number of steps can be reduced.

The second method is conducted such that the optical fiber 1 with the molding material 32 formed on the periphery thereof is formed by extrusion, and then the convex portion 33 in spirals is formed by being wound around the molding material 32. In this method, the structure of the extruder opening can be simplified.

Further, according to the second method, the molding material 32 and the convex portion 33 may be each made of materials with different properties. For instance, the convex portion 33 can be made of a metal.

INDUSTRIAL APPLICABILITY OF THE INVENTION

The collision detection sensors 101 to 104 according to this invention can measure a change in the optical transmission characteristics of the optical fiber 1 by entering light emitted from a light source into the optical fiber 1 and by receiving the light outputted from the optical fiber 1 by an optical receiver. Thus, in case that any one of the collision detection sensors 101 to 104 is installed in the bumper of a vehicle, a circuit can be composed such that collision signal is sent to a vehicle control apparatus when collision with a collision object is judged based on a significant change generated in the optical transmission characteristics of the optical fiber 1.

The vehicle control apparatus can control to raise the bonnet or to inflate the air bag outside of the bonnet so as to reduce the collision shock to the collision object. By raising the bonnet or inflating the air bag, the collision shock in the secondary collision (provided that the collision to the bumper is the primary collision) of a pedestrian with the vehicle can be reduced.

By raising the bonnet, it becomes possible to protect the pedestrian since the pedestrian can be thereby separated from the engine etc. placed in the bonnet. However, when colliding with a hard object having no need to protect such as an electrical pole not with the pedestrian, it is not necessary to raise the bonnet. There is no point to protect such an object by raising the bonnet. Consequently, the hard object such as an electrical pole should be distinguished from the pedestrian. This is possible by estimating the collision power at the time of the collision from the change of waveform in the optical transmission characteristics of the optical fiber 1. Further, it is possible to prevent the pedestrian from the secondary collision directly with the vehicle by inflating the air bag over the hard part of the vehicle body such as a wiper or a pillar part etc.

Although a vehicle is known which can reduce the collision shock that the pedestrian may receive at the time of the collision by rendering the wiper fixing portion (support portion) movable, it becomes possible to obtain a trigger with the mechanism that makes the wiper fixing portion movable only in minimum necessary case such as collision with a pedestrian etc., based on the pedestrian detection by using the collision detection sensors 101 to 104.

The collision shock received when the pedestrian bumps into the bonnet can be reduced by inflating the air bag under the bonnet (on the engine room side and inside) instead of inflating the air bag outside of the bonnet as mentioned above. In this case, it is easy to house the mechanism to inflating the air bag on the engine room side of the bonnet.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A collision detection sensor for detecting a collision of a vehicle and a collision object by converting the collision into a change in optical transmission characteristics of an optical fiber, said collision detection sensor comprising:
    the optical fiber;
    a molding material formed on a periphery of the optical fiber; and
    a convex portion formed on an outer periphery surface of the molding material.

2. The collision detection sensor according to claim 1, wherein the outer periphery surface of the molding material comprises a flat surface facing one direction, and
    wherein a plurality of the convex portions are formed on the flat surface at intervals in a longitudinal direction of the optical fiber.

3. The collision detection sensor according to claim 1, wherein the outer periphery surface of the molding material comprises a first flat surface facing one direction and a second flat surface facing an opposite direction to the one direction, and
    wherein a plurality of the convex portions are formed on the first and second flat surfaces at intervals in a longitudinal direction of the optical fiber.

4. The collision detection sensor according to claim 3, wherein:
    the convex portion formed on the first flat surface is disposed at a different position from the convex portion formed on the second flat surface in the longitudinal direction of the optical fiber.

5. The collision detection sensor according to claim 3, wherein:
    the convex portion formed on the first flat surface is disposed at a same position as the convex portion formed on the second flat surface in the longitudinal direction of the optical fiber.

6. The collision detection sensor according to claim 1, wherein:
    the convex portion is molded integrally with the molding material by using a mold with a concave portion.

7. The collision detection sensor according to claim 1, wherein the outer periphery surface of the molding material comprises a flat surface, and
    wherein the convex portion is attached onto the flat surface of the molding material.

* * * * *